United States Patent
Young et al.

(10) Patent No.: US 7,649,640 B2
(45) Date of Patent: Jan. 19, 2010

(54) SYSTEM AND METHOD OF PROCESSING PRINT JOBS

(75) Inventors: Bryon R. Young, Pittsford, NY (US); Wilbert D. Douglas, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 692 days.

(21) Appl. No.: 11/314,480

(22) Filed: Dec. 21, 2005

(65) Prior Publication Data

US 2007/0139695 A1   Jun. 21, 2007

(51) Int. Cl.
*G06F 3/12* (2006.01)

(52) U.S. Cl. ............... 358/1.13; 358/1.9; 358/1.12; 358/1.14; 358/1.15; 358/1.16; 399/79; 399/361; 399/363

(58) Field of Classification Search ....... 358/1.12–1.16, 358/1.9; 399/79, 361, 363
See application file for complete search history.

(56) References Cited

U.S. PATENT DOCUMENTS

| | | | |
|---|---|---|---|
| 6,202,092 B1 * | 3/2001 | Takimoto | 709/225 |
| 6,813,038 B1 * | 11/2004 | Kadowaki | 358/1.18 |
| 7,170,631 B2 * | 1/2007 | Sakura | 358/1.18 |
| 2003/0151768 A1 * | 8/2003 | Iida | 358/1.15 |
| 2006/0050307 A1 * | 3/2006 | Koike | 358/1.15 |

* cited by examiner

*Primary Examiner*—Chan S Park
(74) *Attorney, Agent, or Firm*—Fay Sharpe LLP (57) ABSTRACT

A method of processing print jobs includes receiving two or more print jobs and organizing the two or more print jobs into one or more job groups that have modifiable group attributes. The method also includes organizing the one or more job groups into one or more group packages that have modifiable package attributes. The method further includes printing at least one of the group packages. A graphical user interface and a printing system are operative to perform the method.

23 Claims, 8 Drawing Sheets

SYSTEM AND METHOD OF PROCESSING PRINT JOBS

BACKGROUND

The present disclosure broadly relates to the art of printing systems and, more particularly, to a user interface and printing system for processing print jobs, as well as a method of processing print jobs.

The terms "print", "printing" and "marking" as used herein are to be broadly interpreted to encompass any action or process involving the production or output of sheet media having text, images, graphics and/or other indicia formed thereon by any process, such as inkjet or electrophotographic processes, for example. The terms "printer" and "printing system" as used here are to be broadly interpreted to encompass any device, apparatus or system that is capable of performing a "printing" action. Examples of such equipment and/or systems include, without limitation, desktop printers, network printers, stand-alone copiers, multi-function printer/copier/facsimile devices, and high-speed printing/publishing systems. Additionally, such exemplary embodiments of equipment, systems and/or processes can utilize sheet media of any type or kind, such as paper, cardstock and/or polymeric film, for example. Furthermore, such exemplary equipment, systems and/or processes can output indicia on such sheet media using any printing or marking substance, such as ink, toner and/or colorant, for example, in monochrome (e.g., black) or one or more colors, or any combination thereof.

It is often desirable to produce packs of printed materials that include multiple documents which are printed on one or more different kinds of sheet media (e.g., white paper, colored paper and transparencies). Commonly, the various documents are also subjected to different finishing operations (e.g., stapling, hole punching, binding, insertion of separator sheets and offset stacking). Currently, the options available for producing such packs of printed materials are somewhat limited and normally include a substantial amount of manual sorting and/or other handling. As such, organizing these packages of materials is typically time consuming and can often be quite costly. What's more, the significant amount of manual sorting that is normally involved can lead to errors and/or omissions, such as including two copies of one print job in a pack of materials and/or omitting a copy of another print job from the pack, for example.

Figure 8:
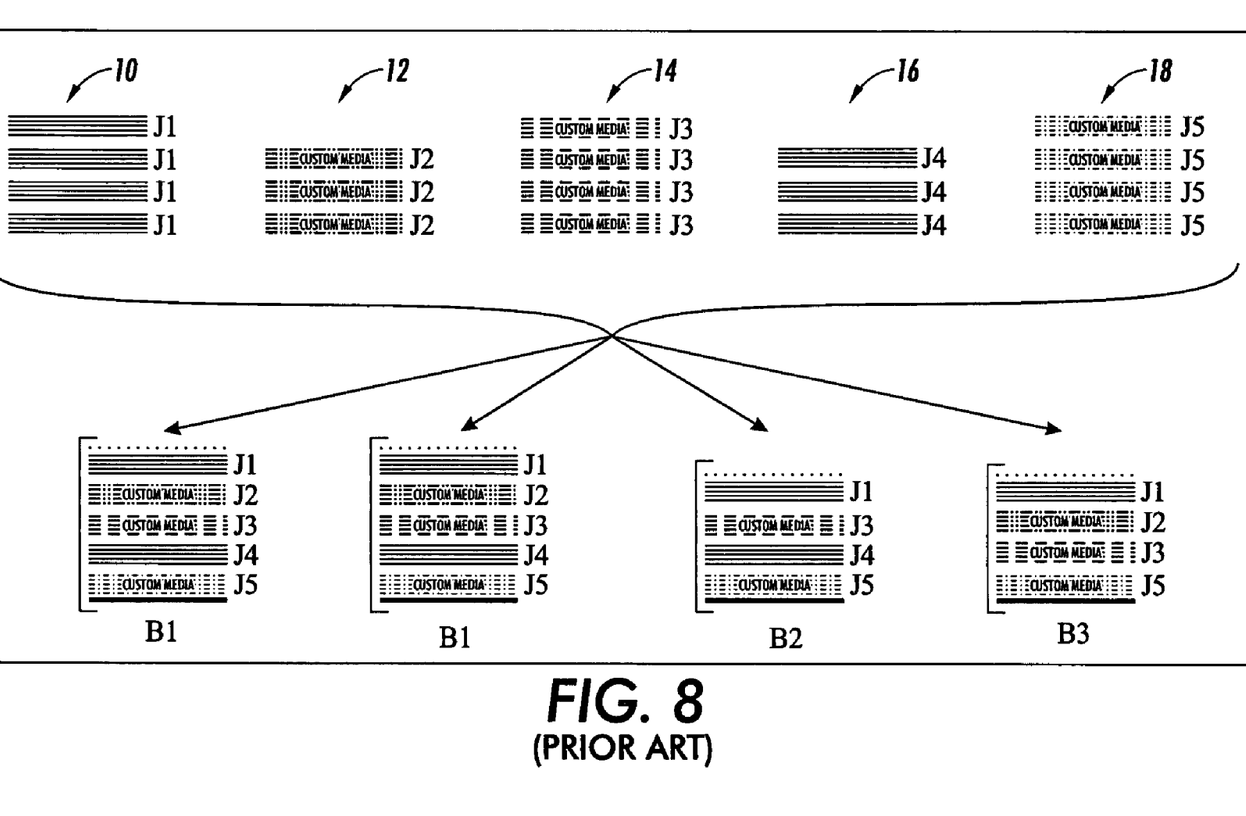
FIG. 8 is a representation of conventional manual sorting of multiple print jobs.

An example of such a manual sorting arrangement is shown in FIG. 8, which illustrates a plurality of stacks of printed documents 10, 12, 14, 16 and 18. Stacks 10, 14 and 18 respectively include four copies of print jobs J1, J3 and J5. Stacks 12 and 16 respectively include three copies of print jobs J2 and J4. Jobs J1 and J4 respectively of stacks 10 and 16 are shown using the same continuous line type, which can optionally be considered to be of the same type or kind of sheet media, such as standard white paper, for example. The term "custom media" shown on print jobs J2, J3 and J5 respectively in stacks 12, 14 and 18 are so labeled merely to indicate that the same are of a different media type than jobs J1 and J4, such as being on colored paper or transparencies, for example. Additionally, jobs J2, J3 and J4 are shown using line types, which can optionally be considered to be of different media types.

The stacks of print jobs are then manually collated or otherwise organized into two complete copies of bundle B1, one copy of bundle B2 and one copy of bundle B3. One example of a situation in which such bundles or packs of materials might be prepared is a business management meeting, where the documents represented by print jobs J2 and J4 are specific to particular business units. In such a case, it may be desirable to limit distribution of the materials to those for whom the information would be relevant. This may be done to minimize the distribution of sensitive information, or for other reasons. Also, it will be appreciated that the numbers of print jobs and bundles shown in FIG. 8 is merely exemplary, and that in most cases, tens or hundreds of copies of each bundle may be produced. In such a scenario, significant cost savings can be achieved by, wherever possible, reducing the number of jobs that are printed. Thus, it would be beneficial to collate and organize the bundles so that print jobs J2 and J4 are omitted from bundles B2 and B3. Using known techniques, however, it may be determined that the expense in time and manual effort associated with printing, sorting and bundling the materials in different ways for different groups of people would offset any reduction in material costs that might be realized by using job specific collation. Thus, the full pack of documents may be unnecessarily produced for each person rather than commit the resources to performing the job specific collation.

In an effort to minimize the manual work associated with the production of packs of documents of this nature, systems have been developed that permit numerous print jobs to be combined or merged together into a single, large print job. This single, large print job can then be sent to a printing system resulting in the output of the numerous documents as a single stack of materials, which can then be repeated as many times as necessary.

Such systems have met with success in certain applications and environments. However, these systems exhibit characteristics that may, in other situations, inhibit the adoption and use of the systems. One such characteristic is that the identities of the individual print jobs are normally lost when the same are merged together into the single, large print job. This is disadvantageous because it leaves the user or operator to keep track of which pages are part of each job. Thus, to insert a separator sheet between two jobs, the user would have to know or determine which two sheets to insert the separator sheet between. Furthermore, reducing the numerous print jobs to a single print job prevents job specific attributes from being maintained. Thus, the resulting large print job is normally edited on a page-by-page basis rather than on a job-by-job basis.

BRIEF DESCRIPTION

One exemplary embodiment of a method of processing print jobs is provided and includes receiving two or more print jobs and organizing the two or more print jobs into one or more job groups, each having a modifiable group attribute associated therewith. The method also includes organizing the one or more job groups into one or more group packages, each having a modifiable package attribute associated therewith. The method further includes printing at least one of the one or more group packages.

Another exemplary embodiment of a method of outputting print jobs is provided and includes providing a printing system. The printing system includes a media source operative to dispense sheet media, a printing engine in operative association with the media source and operative to output sheet media marked with indicia, a finishing unit in operative association with the printing engine receiving sheet media marked with indicia and operative to perform a finishing operation thereon, and a control system in communication with the media source, the printing engine and the finishing unit. The control system includes an input section, a memory and a user interface. The method also includes receiving two or more print jobs through the input section, with each of the two or more print jobs including a modifiable job attribute that is associated therewith. The method further includes storing the two or more print jobs and the modifiable job attribute thereof in the memory. The method also includes displaying the two or more print jobs and the modifiable job attribute thereof in a programming window on the user interface. The method further includes arranging at least one of the two or more print jobs into one or more job groups using a programming window on the user interface. The method further includes arranging at least one of the one or more job groups into a group package using a programming window on the user interface, and outputting the group package using the printing system.

One exemplary embodiment of a printing system is provided and includes a media source adapted to dispense unmarked sheet media, a printing engine receiving unmarked sheet media from the media source and operative to output sheet media marked with indicia, and a finishing unit receiving the marked sheet media from the printing engine and adapted to perform a finishing operation on the marked sheet media. The printing system also includes a controller in communication with the media source, the printing engine and the finishing unit. The printing system further includes an input section in communication with the controller that is adapted to receive a plurality of print jobs with each print job having a corresponding job attribute. Still further, the printing system includes a memory in communication with the controller that is adapted for storing the plurality of print jobs and the corresponding job attributes. The printing system also includes a user interface in communication with the controller that includes a graphical interface configured to display the plurality of print jobs and the corresponding job attributes, receive user-inputted settings of the corresponding job attributes for the plurality of print jobs, and arrange at least one of the plurality of print jobs into one or more job groups having one or more corresponding group attributes. The graphical interface is also configured to display the one or more job groups, receive settings of the one or more group attributes of the one or more job groups, arrange at least one of the one or more job groups into at least one group package having one or more package attributes, and display the at least one group package.

One exemplary embodiment of a graphical user interface is provided that is visually displayable on an associated display screen of an associated printing system and includes at least one text window displaying a plurality of print jobs, one or more job groups, and at least one group package. The plurality of print jobs each include one or more job attributes. The one or more job groups comprises one or more of the plurality of print jobs and having one or more group attributes. The at least one group package comprises at least one of the one or more job groups and includes one or more package attributes. The graphical user interface also includes a representation of at least one of the one or more job attributes, the one or more group attributes or the one or more package attributes. The representation includes a condition indicator showing a current setting of at least one of the one or more job attributes, the one or more group attributes or the one or more of the package attributes.

DETAILED DESCRIPTION

Figure 1:
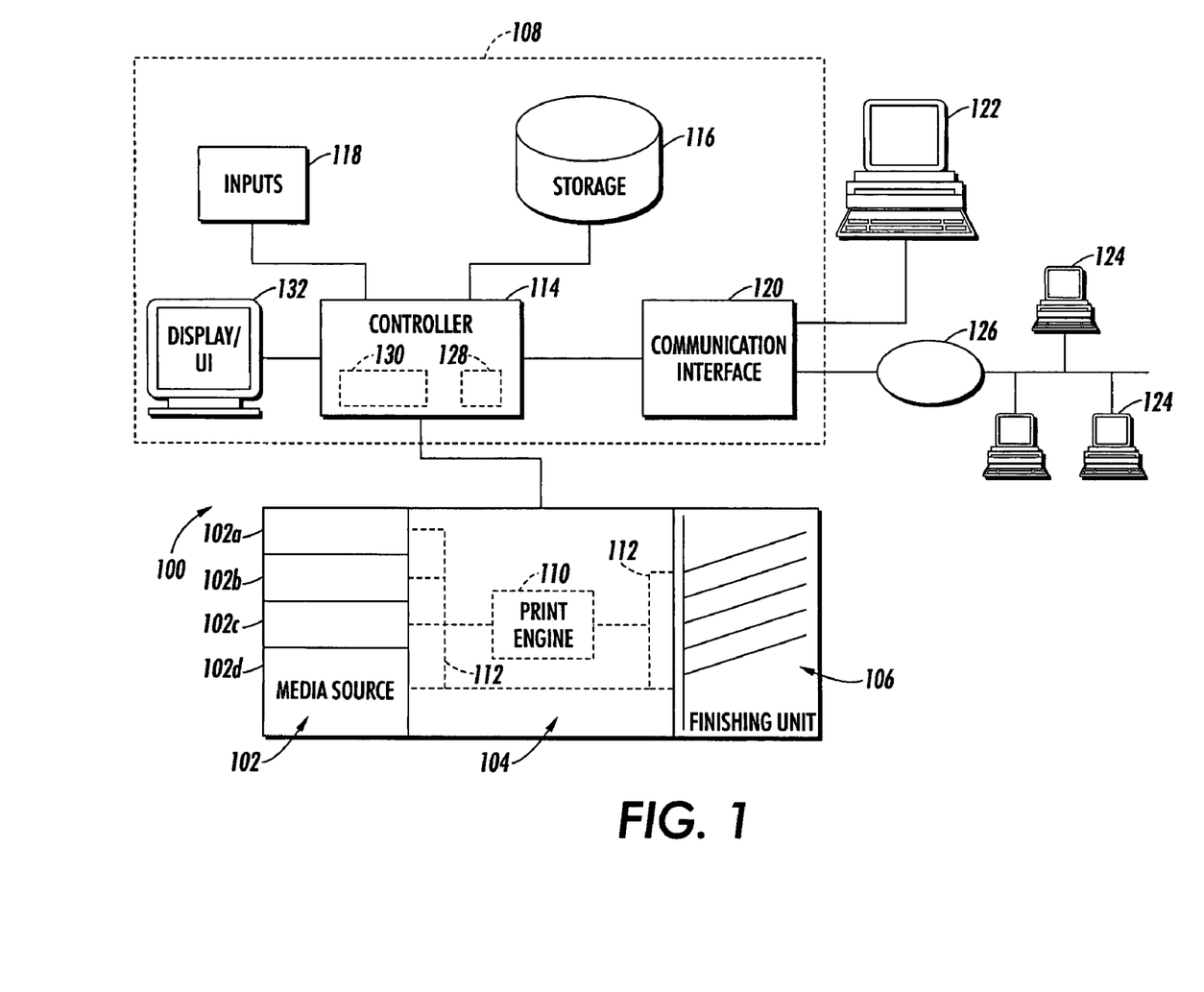
FIG. 1 is a schematic representation of one exemplary embodiment of a printing system.

Turning now to the drawings wherein the showings are for the purpose of illustrating exemplary embodiments, and not for limiting the same, FIG. 1 schematically illustrates a printing system 100 that includes a media source 102, a printing section 104, a finishing unit 106 and a control system 108. It is to be distinctly understood that aspects of the present disclosure are applicable to a wide variety of types and kinds of printing systems, and that printing system 100 is merely exemplary of one suitable printing system.

Media source 102 is shown in FIG. 1 as including multiple media supply trays 102*a*-102*d*, and these media supply trays can store and are operative to dispense sheet media of any type or kind, such as different sizes of sheet media (e.g., letter, legal, A4), different colored sheet media (e.g., white, golden rod, green, blue), different quality and/or thicknesses of sheet media (e.g., recycled paper, plain paper, bond paper, card stock) and/or different media materials (e.g., paper, coated paper, transparencies and/or other polymeric media), for example. Printing section 104 includes one or more printing engines 110 in communication with media source 102 through a media transport pathway 112. It will be appreciated that the one or more printing engines can be of any suitable type or kind, and that such one or more printing engines will operate in accordance with known marking principles, such as ink jet marking or electrophotographic marking, for example.

Finishing unit 106 is in communication with the one or more printing engines of printing section 104 via media pathway 112. The finishing unit can be of any suitable type or kind, and can be capable of performing one or more finishing operations of any type or kind. For example, finishing unit 106 could be operative to stack, collate, staple, hole punch, offset, bind, fold, insert separator sheets, and/or any combination of these or any other finishing operations. As will be recognized by one of skill in the art, sheet media is fed from media source 102 to the one or more printing engines 110 along media pathway 112. Once output by the printing engine(s), the marked sheet media is delivered to the finishing unit for stacking and/or performance of one or more optional finishing operations.

Control system 108 includes a controller 114 that is in communication with media source 102, printing section 104 and finishing unit 106. Control system 108 also includes a data storage device 116, such as a non-volatile memory or hard drive, for example, suitable for storing print jobs, settings, attributes and any other data and/or information. The data storage device is shown in FIG. 1 as being in communication with controller 114. Additionally, control system 108 can optionally include an input section 118 and/or a communication interface 120, both of which are shown in communication with controller 114. Either or both of input section 118 and communication interface 120 can be used to generate, receive, input or otherwise provide print jobs to the printing system. For example, input section 118 could optionally include a raster output scanning system suitable for scanning paper documents and transmitting rasterized images of the scanned documents to the controller or another system or component. As another example, the input section could include an optional memory card reader adapted to retrieve document files, image files or other data or information from memory cards, and transmit such files, data or information to controller 114 or another system or component. As a further example, a print job could be transferred or otherwise sent to the printing system through communication interface 120 from a standalone computer 122, and/or from a computer terminal 124 through a suitable computer network 126.

A print job, however transmitted or received, can be stored in data storage device 116 until recalled for printing. In the exemplary embodiment shown, control system 108 also includes a processing device 128 of any suitable type or kind, such as a microprocessor, for example, for controlling the operation of printing system 100. Additionally, a memory 130 can be used to store software, parameters and other data and/or information for performance and operation of the printing system. A user interface 132, such as a display, keyboard, pointing device or other input device, is in communication with controller 114. In one preferred embodiment, a display is provided that outputs a graphical programming window to the user for entry of user-inputted data. It will be appreciated, however, that such data can be inputted in any suitable manner as well as from other locations and/or using other devices, such as standalone computer 122 or network workstation 124, for example, and that the graphical programming window could optionally be output on the standalone computer or network workstation to facilitate the entry of such data.

Figure 2:
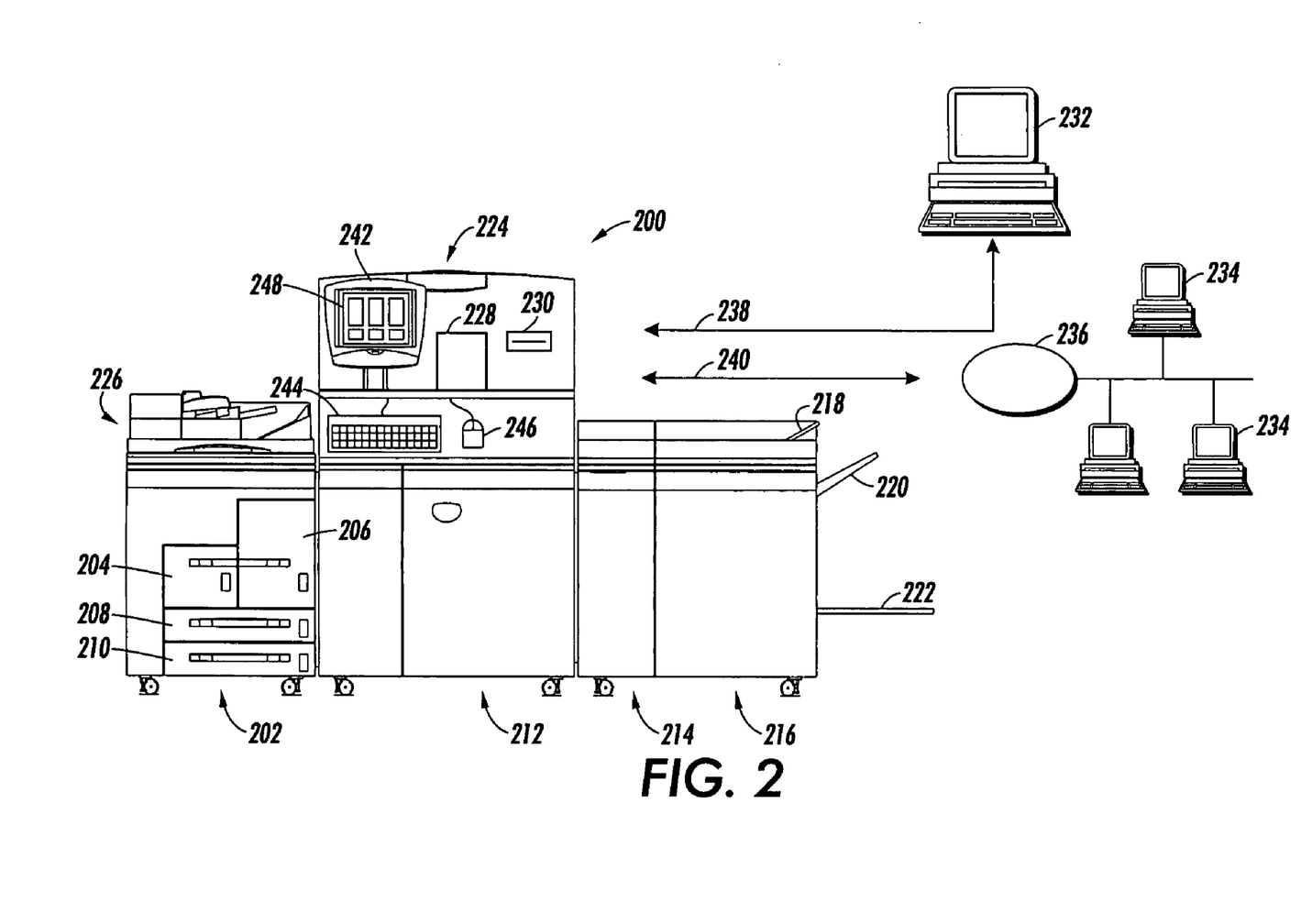
FIG. 2 is an illustration of one exemplary embodiment of the printing system in FIG. 1.

One example of a suitable printing system is shown in FIG. 2 as modular printing system 200, which includes a media supply section 202 adapted to supply various types of sheet media such as can be provided from media supply trays 204, 206, 208 and 210. An image output or printing section 212 is disposed adjacent media supply section 202 and includes one or more marking engines (not shown), of any suitable type or kind. A multi-function finisher interface 214 is disposed adjacent printing section 212. A multi-function finisher 216 is adjacent interface 214 and includes output stations 218, 220 and 222.

Printing system 200 also includes a control system 224 which, in the present exemplary embodiment, is disposed above printing section 212. Control system includes a scanning system 226, which is shown being supported on media supply section 202. The control system can also include a media drive bay 228 and/or a memory card reader 230, though it will be appreciated that other input devices could additionally, or in the alternative, be included. Control system 224 also includes a suitable communication interface (not shown) for sending and/or receiving communications with a standalone computer 232 and/or multiple workstations 234 through a computer network 236, as is indicated by arrows 238 and 240, respectively.

Control system 224 further includes a user interface, such as a display 242, a keyboard 244 and a pointing device 246. A graphical programming window 248 is output on display 242 and can be used by the printing system user to operate the printing system, as will be discussed in detail hereinafter. It will be appreciated, however, that any suitable printing system can be used and that printing system 200 discussed herein is merely exemplary.

Figure 3:
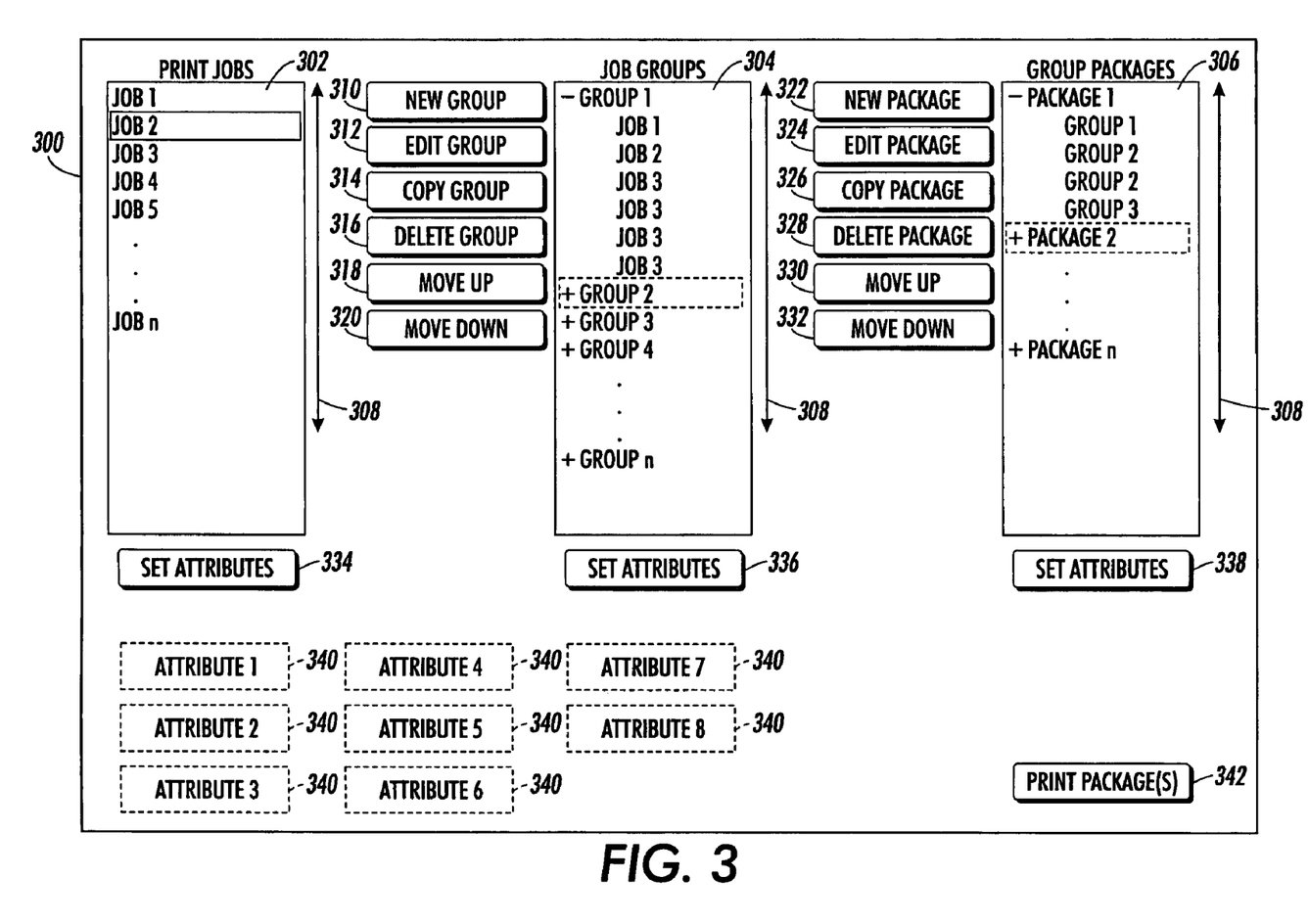
FIG. 3 is a representation of one exemplary embodiment of a programming screen on the display of the printing system in FIG. 1.

FIG. 3 is a representation of an exemplary graphical user interface or programming window 300 such as might be output on a user interface, such as display 132 or 242, for example. Programming window 300 can include graphical representations of any type or kind, such as text windows, buttons, switches, list boxes, check boxes, sliders, dials, secondary or pop-up programming windows, and/or any other suitable text, graphic, image or indicia suitable for conveying information to a user or receiving input from a user. Programming window 300 can include one or more text windows. For example, three text windows 302, 304 and 306 are shown in FIG. 3 and respectively display print jobs, job groups, and group packages. A scroll bar 308 or other suitable graphical device can be used to access text that extends out of the text window. In programming window 300, text window 302 includes a listing of print jobs (e.g., Job 1, Job 2, Job 3, Job 4, Job 5 and Job n) that have been received or otherwise input into the printing system, such as system 100 or 200, for example. Any suitable number of print jobs can be listed in text window 302, such as from 1 print job to 100 print jobs, for example, and one or more of the print jobs can be selected at one time by the user or operator. For example, Job 2 is shown as being selected in text window 302 by the rectangular box extending therearound.

Text window 304 includes a listing of job groups (e.g., Group 1, Group 2, Group 3, Group 4, and Group n) that have been formed using jobs listed in text window 302. Text window 304 can list or otherwise display any suitable number of job groups, such as from 1 job group to 50 job groups, for example, and one or more of the job groups can be selected at one time by the user or operator. For example, Group 2 is shown as being selected in text window 304. Text window 306 includes a listing of group packages (e.g., Package 1, Package 2 and Package n) that have been formed using groups listed in text window 304. Text box 306 can list or otherwise display any suitable number of group packages, such as from 1 group package to 25 group packages, for example, and one or more of the group packages can be selected at one time by the user or operator. For example, Package 2 is shown as being selected in text window 306. It will be appreciated, however, that any other suitable arrangement could alternately be used. For example, only one text window could be provided and all of the job, group and package listings could be shown therein. Optionally, suitable indicia (e.g., "+" and "−") can be used to expand and/or collapse the listings in the text boxes. It will be appreciated that under most conditions of operation, either one or more of the print jobs, one or more of the job groups, or one or more of the group packages will be selected at any given time. As such, Job 2 is shown as being selected in FIG. 3 with Group 2 and Package 2 shown as being selected by using dashed lines, which suggest that either of these selections would be made as an alternative to the selection of Job 2 in text window 302. However, in other arrangements, it may be desirable to select print jobs, job groups and/or group packages in combination with one another and that such selection falls within this disclosure.

In use, the print jobs listed in text window 302 will be those print jobs that have been generated, input or otherwise received by the printing system. For example, print jobs could be generated by using the rastor output scanning system. As another example, print jobs could be input as data files using a suitable media input device, such as a removable storage disk (e.g., CD, DVD or floppy disk) or memory card, for example. As a further example, print jobs can be received by the printing system from computing devices in communication with the printing system or in communication through a suitable network. In one exemplary embodiment, job groups, such as Groups 1-N in text window 304, for example, can be created by the user from the print jobs listed in text window 302. For example, Group 1 is expanded in text window 304 is shown as including one occurrence of Job 1, one occurrence of Job 2 and four occurrences of Job 3. In the exemplary embodiment shown, a button 310 labeled as "New group" can be used to add a new job group to the text window. A button 312 labeled "Edit group" can be used to modify one of the existing groups listed in text window 304. A group listed in text window 304 can be duplicated using a button 314 labeled "Copy group" and an existing group can be deleted using a button 316 labeled "Delete group." Additionally, the order of the listed groups can be rearranged using buttons 318 and 320, which are respectively labeled as "Move up" and "Move down."

Package 1 shown in text window 306 is shown as being formed from one occurrence of Group 1, two occurrences of Group 2 and one occurrence of Group 3. Similar to the buttons described for use in association with the job groups listed in text window 304, buttons 322-332 can be used to create, modify and delete group packages as well as rearrange the listing of packages in text window 306. Additionally, it will be appreciated that graphical interface features such as drag and drop, and keyboard shortcuts can be used to create, modify and/or delete print jobs, job groups and/or group packages.

In a preferred embodiment, each print job will have one or more modifiable or otherwise user-changeable print job attributes, as will be discussed in further detail hereinafter. Additionally, each job group will have one or more modifiable or otherwise user-changeable job group attributes, and each group package will have one or more modifiable or otherwise user-changeable group package attributes. The settings and/or attributes of the print jobs, job groups and group packages are represented by one or more condition indicators of any suitable type or kind, such as text entries, graphical indicia or any combination thereof. In a preferred arrangement, the condition indicators are operable to change or otherwise modify the condition or setting of the attribute. For example, a condition indicator showing the current quantity of a given print job, job group or group package could be displayed with a suitable field or graphical device (e.g., up arrow, down arrow) for modifying the quantity. As another example, a condition indicator showing the status of a stapling action (e.g., ON or OFF) could be displayed for a selected print job, job group, group package or combination thereof. Preferably, the condition indicator for such a stapling operation will be modifiable to toggle the action ON and OFF. Additionally, the same condition indicator, or alternately a different indicator could be used, can optionally provide two or more possible configurations for the stapling action (e.g., top left, top right, vertical staple, horizontal staple, diagonal staple). Furthermore, condition indicators will preferably be provided for displaying and modifying other settings and attributes, such as those involving hole-punching actions, binding actions, offsetting actions and any other type or kind of printing or finishing action that can be used or associated with a print job, job group and/or group package.

In the exemplary embodiment shown in FIG. 3, programming window 300 includes "Set Attribute" buttons 334, 336, and 338 respectively associated with text windows 302, 304 and 306. Thus, it will be appreciated that button 334 is operative to launch a further programming window (not shown) that displays the available settings and attributes of the one or more selected print jobs, such as by using suitable condition indicators as have been discussed above. Additionally, a programming window launched by button 334 could permit such settings and attributes to be modified or otherwise changed by the user, such as by using the condition indicators. Similarly, buttons 336 and 338 are operative to launch further programming windows (not shown) that display the available settings and attributes of the one or more selected job groups or group packages, respectively, such as by using suitable condition indicators. Furthermore, a programming window launched by either of buttons 336 and 338 could permit the settings and attributes to be modified or otherwise changed by the user, such as by utilizing the condition indicators.

Additionally, or as an alternative, settings and attributes can be displayed directly within programming window 300 for review and/or modification by the user using suitable condition indicators, which are represented in FIG. 3 as boxes 340. Such suitable condition indicators can be associated with settings and/or attributes of one or more of the print jobs, job groups, and/or group packages. It will be appreciated boxes 340 illustrating Attributes 1-8 are merely representative of condition indicators of settings or attributes that could be used with any one or more of the print jobs, job groups and/or group packages. Furthermore, it will be appreciated that any suitable number, type or kind of condition indicators can be shown by boxes 340 and that the number of settings and/or attributes represented are merely exemplary. Further still, it will be appreciated that the number, type and/or kind of settings or attributes that are shown or represented as boxes 340 on programming 300 could, optionally, be variable and depend upon the selection that is made in the one or more text windows (i.e., whether a print job, two or more print jobs, a job group, two or more job groups, a group package, or two or more group packages are selected). Alternately, all possible settings and/or attributes could optionally be shown with only those applicable to the item selected in the text windows being active and available. That is, all inactive items may be grayed out or otherwise indicated as being unavailable. Examples of suitable attributes that could be shown in one or more of boxes 340 include, without limitation, quantity, staple, staple configuration, simplex/duplex, hole punch, hole punch configuration, binding, and offset stacking.

Returning again to the use of programming window 300, the one or more job groups are formed, organized, arranged or otherwise generated using the two or more print jobs listed in text window 302. The various attributes of each print job can be individually set using either button 334 and/or suitable condition indicators, such as boxes 340, as may be provided. One or more attributes of the job groups can also be set using button 336 and/or one or more of boxes 340, as may be provided. It will be appreciated that, in certain circumstances, the group attribute could override one more of the print job attributes that have been previously set. The group packages are formed, organized, arranged or otherwise generated using the job groups listed in text window 304, and each package can include various attributes that can be set using button 338 and/or boxes 340, as may be provided. Again, one or more of the package attributes can override one or more of the group or job attributes. Once one or more group packages have been generated, any number of these one or more group packages can be selected and sent or otherwise released to the printing system, such as by using a button 342, for example.

Figure 4:
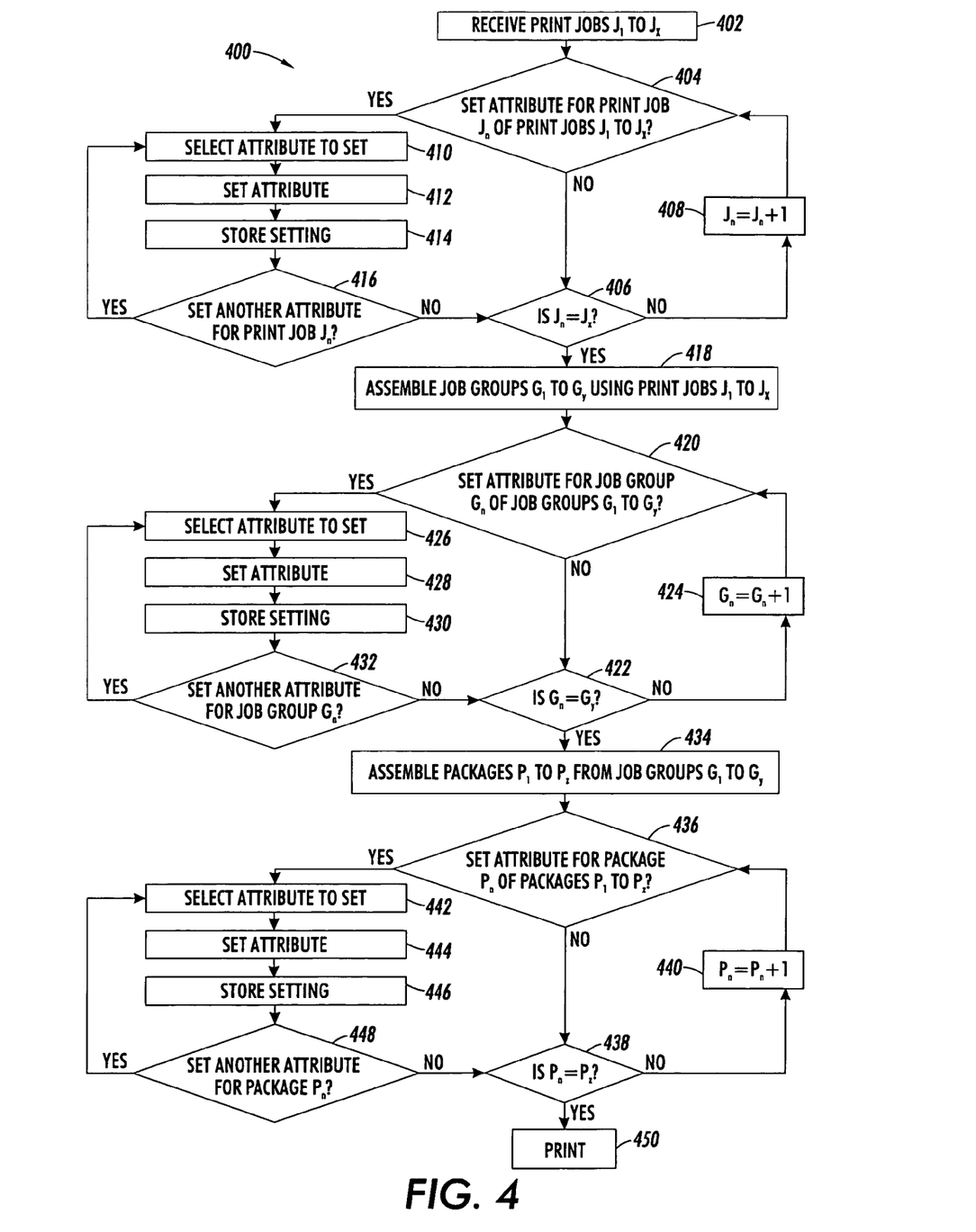
FIG. 4 is a flow chart of one exemplary method of processing print jobs.

Turning now to FIG. 4, one exemplary representation of a method 400 of processing print jobs includes receiving print jobs $J_1$ to $J_X$ as indicated by box 402. It will be appreciated that print jobs $J_1$ to $J_X$ can be generated, input or otherwise received in any suitable manner as discussed above. At a decision box 404, a determination is made as to whether an attribute is to be set for a given print job $J_n$ of print jobs $J_1$ to $J_X$. If a NO determination is made, an inquiry at decision box 406 is made as to whether print job $J_n$ is the last print job for which attributes might be set. If a NO determination is made, print job $J_n$ is incremented to the next print job as indicated by box 408. If, however, a YES determination is made at decision box 404, the attribute that is to be set or modified is selected at box 410. The attribute is set by the user or operator at box 412, and the attribute setting is stored in a suitable manner, such as in a memory or on a hard drive, as indicated at box 414. An inquiry is then made at decision box 416 as to whether another attribute for print job $J_n$ is to be set. A YES determination at decision box 416 returns to box 410 so that the user or operator can select another attribute to set. A NO determination at decision box 416 proceeds to decision box 406 at which it is determined whether print job $J_n$ is the last print job for which an attribute is to be set, as discussed above.

If a YES determination is made at decision box 406, one or more job groups $G_1$ to $G_Y$ can be assembled or otherwise created using print jobs $J_1$ to $J_X$ as indicated at box 418. A decision box 420 is then reached at which a determination is made as to whether an attribute for a given job group $G_n$ of job groups $G_1$ to $G_Y$ is to be set. A NO determination at decision box 420 proceeds to decision box 422 at which a determination is made as to whether job group $G_n$ is the last of the job groups for which an attribute is to be set. If a NO determination is reached at decision box 422, job group $G_n$ is incremented to the next job group, as indicated by box 424. If a YES determination is reached at decision box 420, the attribute that is to be set or modified is selected by the user or operator at box 426. Thereafter, the attribute is set by the user or operator at box 428, and the attribute setting is stored in a suitable manner as indicated by box 430. A decision box 432 is reached after the setting is stored at box 430, and an inquiry is made as to whether another attribute for job group $G_n$ is to be set. A YES determination at decision box 432 returns to box 426 for the selection of another attribute to be set. A NO determination at decision box 432 proceeds to decision box 422 at which a determination is made as to whether job group $G_n$ is the last job group for which an attribute is to be set.

A YES determination at decision box 422 proceeds to box 434 at which group packages $P_1$ to $P_Z$ are assembled from job groups $G_1$ to $G_Y$. A decision box 436 is reached thereafter and an inquiry is made as to whether an attribute for group package $P_n$ of group packages $P_1$ to $P_Z$ is to be set. If a NO determination is made at decision box 436, decision box 438 is reached at which a determination is made as to whether $P_n$ is the last package for which an attribute is to be set. If a NO determination is reached at decision box 438, group package $P_n$ is incremented to the next group package as indicated by box 440. If a YES determination is reached at decision box 436, an attribute of the package to be set is selected, as indicated by box 442. Thereafter, a user or operator sets the attribute at box 444, and the setting is stored in a suitable manner at box 446. A decision box 448 is reached thereafter and an inquiry is made as to whether another attribute for group package $P_n$ is to be set. A YES determination at decision box 448 returns to box 442 and another attribute of group package to $P_n$ is selected. A NO determination at decision box 448 proceeds to decision box 438 at which it is determined whether $P_n$ is the last package for which an attribute is to be set. A YES determination at decision box 438 proceeds to box 450 at which the package or packages are released to the printing system for production.

Figure 5:
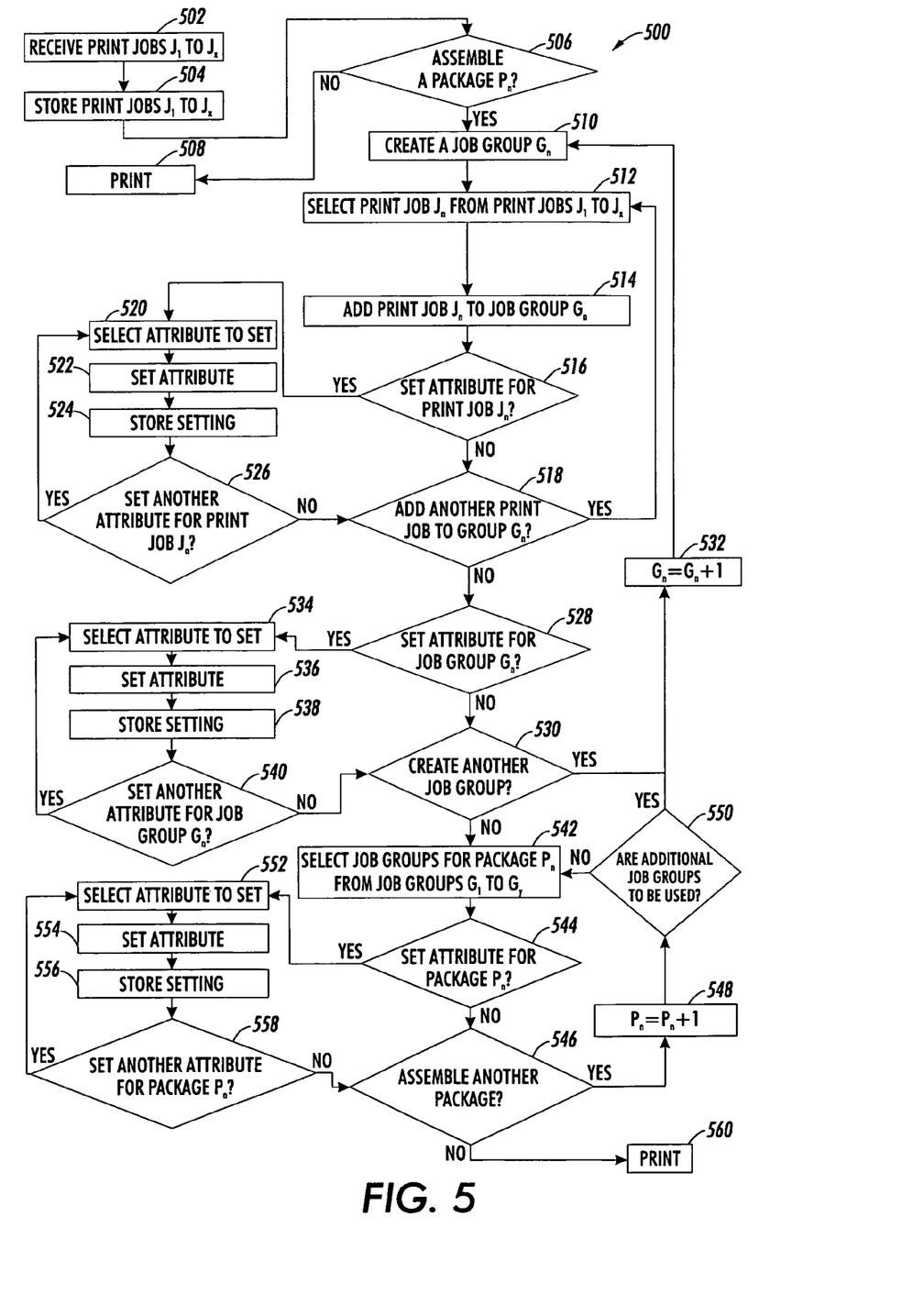
FIG. 5 is a flow chart of another exemplary method of processing print jobs.

Another representation of a method 500 of processing print jobs is shown in FIG. 5. Method 500 includes receiving print jobs $J_1$ to $J_X$ as indicated by box 502 and storing print jobs $J_1$ to $J_X$ as indicated by box 504. Once the print jobs have been stored in a suitable manner, method 500 proceeds to decision box 506 at which a determination is made as to whether a package $P_n$ is to be assembled. If a NO determination is made at decision box 506, one or more of print jobs $J_1$ to $J_X$ can be released to the printing system as indicated by box 508, or otherwise processed or modified by the user or operator. If a YES determination is made at decision box 506, a job group $G_n$ is created at box 510. Thereafter, a print job $J_n$ is selected from print jobs $J_1$ to $J_X$ at box 512 and is added to job group $G_n$ at box 514. A decision box 516 is reached and an inquiry is made as to whether to set an attribute for print job $J_n$. If a NO determination is reached, an inquiry is made at decision box 518 as to whether another print job is to be added to group $G_n$. If a YES determination is made, the operator or user is returned to box 512 to select another print job from jobs $J_1$ to $J_X$.

If a YES determination is made at decision box 516, an attribute that is to be set is selected at box 520. The user or operator sets the attribute at box 522 and the setting is stored in a suitable manner as indicated by box 524. Thereafter, an inquiry is made at decision box 526 as to whether another attribute for print job $J_n$ is to be set. A YES determination returns select another attribute to set at box 520. A NO determination at decision box 526 proceeds to decision box 518 at which a determination is made as to whether another print job is to be added to group $G_n$.

A NO determination at decision box 518 proceeds to decision box 528 and an inquiry is made as to whether an attribute for job group $G_n$ is to be set. If a NO determination is reached at decision box 528, an inquiry is made at decision box 530 as to whether to create another job group. A YES determination at decision box 530 increments job group $G_n$ to the next job group at box 532 and returns to box 510 to create the next new job group. If a YES determination is made at decision box 528, box 534 is reached and the attribute that is to be set is selected. The user or operator thereafter sets the attribute in box 536 and the setting is stored in a suitable manner as indicated by box 538. Thereafter, an inquiry is made at decision box 540 as to whether another attribute for job group $G_n$ is to be set. A YES determination at decision box 540 returns the user or operator to box 534 to select another attribute of job group $G_n$ to be set. A NO determination at decision box 540 proceeds to decision box 530 where an inquiry is made as to whether another job group is to be created.

If a NO determination is reached in decision box 530, the job groups of groups $G_1$ to $G_Y$ are selected for package $P_n$ at box 542. Thereafter, an inquiry is made at decision box 544 as to whether an attribute for package $P_n$ is to be set. If a NO determination is made at decision box 544, decision box 546 is reached and an inquiry is made as to whether another package is to be assembled. A YES determination at decision box 546 increments group package $P_n$ to the next package at box 548. Thereafter, a decision box 550 is reached and an inquiry is made as to whether additional job groups are to be used to form the new package. If a NO determination is made at decision box 550, method 500 proceeds to box 542 to select job groups for the new package. If a YES determination is made at decision box 550, the group number is incremented at box 532 and method 500 proceeds to box 510 to create a new job group.

If a YES determination is made at decision box 544, an attribute to be set is selected at box 552. Thereafter, the user or operator sets the attribute at box 554 and the setting is stored in a suitable manner as indicated by box 556. Thereafter, an inquiry is made at decision box 558 as to whether another attribute for package $P_n$ is to be set. If a YES determination is made at decision box 558, box 552 is reached and the next attribute of group package $P_n$ to set is selected. If a NO determination is reached at decision box 558, the method proceeds to decision box 546 where an inquiry is made as to whether or not another package is to be assembled. If a NO determination is reached at decision box 546, one or more of the packages is released to the printing system as indicated by box 560.

Figure 6:
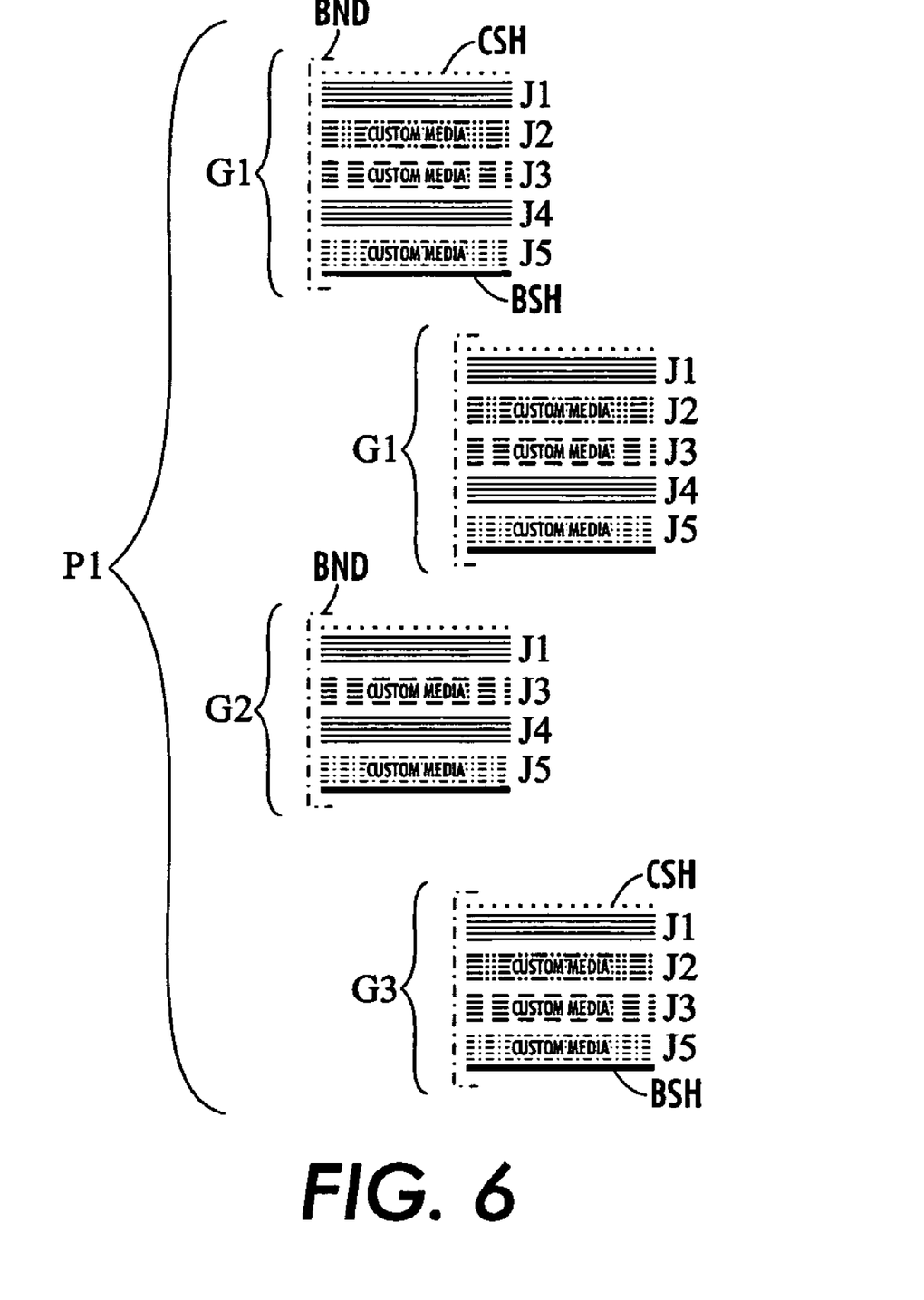
FIG. 6 is a representation of one exemplary embodiment of a printed package output by the printing system in FIG. 1.

FIG. 6 is a representation of one example of a printed package output by a printing system and/or method, as discussed above. Package P1 includes two occurrences or group G1, one occurrence of group G2 and one occurrence of G3. Group G1 includes one occurrence of jobs J1 to J5. Additionally, a cover sheet CSH and a backing sheet BSH is provided, and the group is bound by a binding BND. Similarly, groups G2 and G3 include a cover sheet CSH, a backing sheet BSH and a binding BND. However, group G2 does not include an occurrence of job J2. Furthermore, group G3 does not include an occurrence of job J4.

It will be appreciated that groups G1, G2 and G3 are identical to bundles B1, B2 and B3 discussed above with regard to FIG. 8. However, the finished product output by the printing system and method could include job groups with cover sheets, backing sheets, and which are bound and stacked in an offset arrangement. All of this could be accomplished by outputting one group package, namely, package P1. Whereas, the manual collating and organizing discussed with regard to FIG. 8 would require further steps of inserting cover and backing sheets and binding each bundle.

Figure 7:
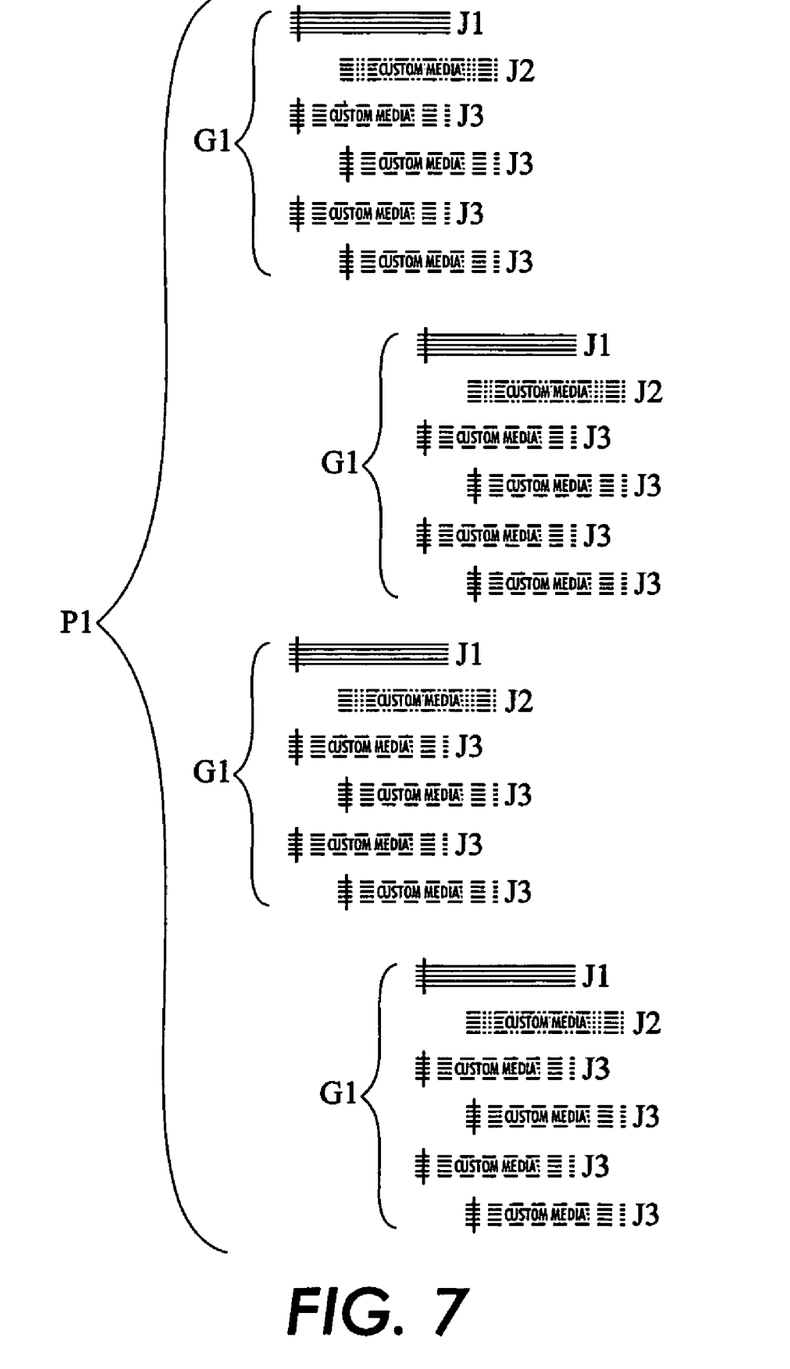
FIG. 7 is a representation of another exemplary embodiment of a printed package output by the system in FIG. 1.

Another representation of an example of a printed package output by a system and/or method discussed above is shown in FIG. 7. Package P1 includes four occurrences of group G1 which are output in an offset arrangement for ease of separation of the groups. Each group G1 includes one occurrence of job J1, one occurrence of job J2 and four occurrences of job J3. Each occurrence of jobs J1 and J3 are stapled, as indicated by the vertical line extending through the stack of media. Each occurrence of job J2 is indicated as being not stapled. Furthermore, the jobs forming each group G1 are also stacked in an offset arrangement.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of processing print jobs, said method comprising:
 providing a printing system including a control system;
 receiving two or more print jobs that each have one or more modifiable print job attributes;
 organizing said two or more print jobs into one or more job groups using said control system while maintaining said one or more modifiable print job attributes of said two or more print jobs, each of said one or more job groups having a modifiable group attribute associated therewith;
 organizing at least two of said job groups into one or more group packages using said control system while maintaining said one or more modifiable print job attributes of said two or more print jobs and said modifiable group attribute of said one or more job groups, each of said one or more group packages having a modifiable package attribute associated therewith; and,
 printing at least one of said one or more group packages using at least said modifiable package attribute.

2. A method according to claim 1 further comprising receiving a user-inputted attribute setting for one of said group attribute and said package attribute.

3. A method according to claim 2 further comprising storing said user inputted attribute setting.

4. A method according to claim 2, wherein receiving a user-inputted attribute setting includes receiving an input corresponding to one of a quantity of a job group, a quantity of a group package, a stapling action, a hole-punching action, a binding action and an offsetting action.

5. A method according to claim 1, wherein organizing said two or more print jobs into one or more job groups includes receiving a user-inputted selection of at least one print job of said two or more print jobs and associating said user-inputted selection with at least one of said one or more job groups.

6. A method according to claim 1, wherein organizing said one or more job groups into one or more group packages includes receiving a user-inputted selection of at least one job group of said one or more job groups and associating said user-inputted selection with at least one of said one or more group packages.

7. A method according to claim 1, wherein said two or more print jobs include job attributes, said method further comprising receiving a user-inputted attribute setting for one of said job attributes.

8. A method according to claim 7 further comprising storing said two or more print jobs and an attribute setting corresponding thereto.

9. A method according to claim 7, wherein receiving said user-inputted attribute setting includes receiving a setting corresponding to one of a quantity of a print job, a stapling action, a hole-punching action, a binding action and an offsetting action.

10. A method of outputting print jobs, said method comprising:
 providing a printing system that includes:
  a media source operative to dispense sheet media;
  a printing engine in operative association with said media source and operative to output sheet media marked with indicia;
  a finishing unit in operative association with said printing engine receiving sheet media marked with indicia and operative to perform a finishing operation thereon; and,
  a control system in communication with said media source, said printing engine and said finishing unit, said control system including an input section, a memory and a user interface;
 receiving two or more print jobs through said input section with each of said two or more print jobs including a modifiable job attribute associated therewith;
 storing said two or more print jobs and said modifiable job attribute thereof in said memory;
 displaying said two or more print jobs and said modifiable job attribute thereof in a programming window on said user interface;
 arranging at least one of said two or more print jobs into one or more job groups using a programming window on said user interface while maintaining said modifiable job attribute of said two or more print jobs;
 arranging at least two of said job groups into a group package having a modifiable package attribute using a programming window on said user interface; and,
 outputting said group package using said printing system based at least in part on said modifiable package attribute.

11. A method according to claim 10 further comprising receiving user-inputted data modifying a modifiable job attribute associated with one of said two or more print jobs.

12. A method according to claim 10, wherein said one or more job groups each include corresponding group attributes, and said method further comprises storing said group attributes in said memory.

13. A method according to claim 12 further comprising receiving user-inputted data modifying at least one of said group attributes.

14. A method according to claim 13, wherein modifying said at least one of said group attributes includes overriding one of said job attributes.

15. A method according to claim 12, further comprising storing said package attribute in said memory.

16. A method according to claim 15 further comprising receiving user-inputted data modifying said package attribute.

17. A method according to claim 16, wherein modifying said package attribute includes overriding one of said group attributes.

18. A printing system comprising:
- a media source adapted to dispense unmarked sheet media;
- a printing engine receiving said unmarked sheet media from said media source and operative to output sheet media marked with an indicia;
- a finishing unit receiving said marked sheet media from said printing engine and adapted to perform a finishing operation on said marked sheet media;
- a controller in communication with said media source, said printing engine and said finishing unit;
- an input section in communication with said controller adapted to receive a plurality of print jobs with each print job having a corresponding job attribute;
- a memory in communication with said controller and adapted for storing said plurality of print jobs and said corresponding job attributes; and,
- a user interface in communication with said controller including a graphical interface configured to:
  - display said plurality of print jobs and said corresponding job attributes;
  - receive user-inputted settings of said corresponding job attributes for said plurality of print jobs;
  - arrange at least one of said plurality of print jobs into one or more job groups having one or more corresponding group attributes while said corresponding job attributes of said plurality of print jobs are maintained in said memory;
  - display said one or more job groups;
  - receive settings of said one or more group attributes of said one or more job groups;
  - arrange at least two of said one or more job groups into at least one group package having one or more package attributes while said corresponding job attributes of said plurality of print jobs and said one or more corresponding group attributes of said one or more job groups are maintained in said memory;
  - display said at least one group package; and,
  - release said at least one group package to said printing engine for production using at least said one or more package attributes.

19. A printing system according to claim 18 further comprising a communication interface adapted to communicate with at least one of an associated computer or an associated computer network.

20. A printing system according to claim 19, wherein said communication interface is operative to display at least one of said plurality of print jobs, said one or more job groups or said at least one group package and to receive user-inputted settings thereof.

21. A printing system according to claim 19, wherein said communication interface is operative to receive a print job from at least one of the associated computer or the associated computer network.

22. A printing system according to claim 18, wherein said user interface includes:
- at least one text window displaying at least one of said plurality of print jobs and said corresponding job attributes, said one or more job groups and said one or more group attributes, and said at least one group package and said one or more package attributes; and,
- a representation of at least one of said corresponding job attributes, said one or more group attributes or said one or more package attributes, said representation including a condition indicator showing a current setting of said at least one of said corresponding job attributes, said one or more group attributes or said one or more package attributes.

23. A printing system according to claim 22, wherein said at least one text window includes first, second and third text windows, said first text window displaying said plurality of print jobs, said second text window displaying at least said one or more job groups, and said third text window displaying at least said at least one group package.

* * * * *